United States Patent
Middleton, Jr. et al.

(10) Patent No.: US 9,605,581 B1
(45) Date of Patent: Mar. 28, 2017

(54) PASSIVE EXHAUST VALVE WITH FLOATING SPRING STOP

(71) Applicant: Middleville Tool & Die Co., Middleville, MI (US)

(72) Inventors: Robert Leroy Middleton, Jr., Middleville, MI (US); Justin Tyler Middleton, Middleville, MI (US); Robert Leroy Middleton, Sr., Middleville, MI (US)

(73) Assignee: Middleville Tool & Die Co., Middleville, MI (US)

( * ) Notice: Subject to any disclaimer, the term of this patent is extended or adjusted under 35 U.S.C. 154(b) by 7 days.

(21) Appl. No.: 15/045,565

(22) Filed: Feb. 17, 2016

Related U.S. Application Data

(60) Provisional application No. 62/387,411, filed on Dec. 24, 2015.

(51) Int. Cl.
| | | |
|---|---|---|
| *F16K 15/03* | (2006.01) | |
| *F01N 13/08* | (2010.01) | |
| *F16K 25/00* | (2006.01) | |
| *F16K 47/04* | (2006.01) | |
| *F16K 27/02* | (2006.01) | |

(52) U.S. Cl.
CPC .............. *F01N 13/08* (2013.01); *F16K 25/00* (2013.01); *F16K 47/04* (2013.01); *F16K 15/033* (2013.01); *F16K 27/0209* (2013.01)

(58) Field of Classification Search
CPC ..... F16K 27/0209; F16K 15/033; F01N 13/08
USPC ......................................................... 137/527
See application file for complete search history.

(56) References Cited

U.S. PATENT DOCUMENTS

| | | | |
|---|---|---|---|
| 399,390 A * | 3/1889 | ereckson ............... | F16K 15/033 137/527 |
| 1,242,621 A | 10/1917 | Watkins | |
| 1,422,466 A | 7/1922 | Morse | |
| 1,447,380 A | 3/1923 | Goetz | |

(Continued)

FOREIGN PATENT DOCUMENTS

| | | |
|---|---|---|
| GB | 187916 | 11/1922 |

OTHER PUBLICATIONS

International Search Report and Written Opinion dated Apr. 21, 2016 from corresponding PCT Application No. PCT/US2016/018186.

(Continued)

*Primary Examiner* — Kevin Lee
*Assistant Examiner* — P. Macade Nichols
(74) *Attorney, Agent, or Firm* — Gardner, Linn, Burkhart & Flory, LLP

(57) ABSTRACT

A passive exhaust valve assembly includes an exhaust conduit or pipe section with a valve plate or vane member that can pivot within the interior section or volume of the exhaust conduit to regulate the flow of exhaust gases through the exhaust conduit. A flexible bumper element, such as a metal mesh pad, may be positioned on the interior surface of the exhaust conduit, such that an end portion of the valve plate may contact the mesh pad in the closed position. The bumper element may be disposed in a recessed pocket or depression and may be biased inward, such as with a spring, for the end portion of the valve plate to contact the bumper element as it moves toward the closed position, and thereby gradually reduce the closure speed of the valve plate to the closed position.

20 Claims, 12 Drawing Sheets

(56) References Cited

U.S. PATENT DOCUMENTS

| | | | |
|---|---|---|---|
| 1,613,322 A | 1/1927 | Goetz | |
| 1,672,266 A | 6/1928 | Linendoll | |
| 2,936,778 A | 5/1960 | Stillwagon | |
| 3,234,924 A | 2/1966 | May | |
| 4,682,674 A | 7/1987 | Schmidt | |
| 4,699,244 A | 10/1987 | Bergquist et al. | |
| 5,046,408 A * | 9/1991 | Eugenio | F24F 13/1426 137/527.6 |
| 5,305,787 A | 4/1994 | Thygesen | |
| 5,355,673 A | 10/1994 | Sterling et al. | |
| 6,338,246 B2 | 1/2002 | Eguchi et al. | |
| 6,739,579 B1 | 5/2004 | Rim | |
| 7,434,570 B2 | 10/2008 | Hill | |
| 7,628,250 B2 | 12/2009 | Abram et al. | |
| 7,775,322 B2 | 8/2010 | Hill | |
| 7,896,130 B2 | 3/2011 | Hill et al. | |
| 8,191,572 B2 | 6/2012 | Lefler et al. | |
| 8,201,401 B2 | 6/2012 | Abram et al. | |
| 8,215,103 B2 | 7/2012 | Hill | |
| 8,381,401 B2 | 2/2013 | Sahs et al. | |
| 8,468,813 B2 | 6/2013 | Hill et al. | |
| 8,657,065 B1 | 2/2014 | Hill | |
| 8,776,508 B2 | 7/2014 | Abram et al. | |
| 8,950,731 B2 | 2/2015 | Ishihata et al. | |
| 2006/0260868 A1 | 11/2006 | Suzuki et al. | |
| 2007/0283680 A1 | 12/2007 | Willats et al. | |
| 2008/0083218 A1 | 4/2008 | Abram et al. | |
| 2008/0115494 A1 | 5/2008 | Willats et al. | |
| 2009/0126358 A1 | 5/2009 | Abram et al. | |
| 2009/0126359 A1 | 5/2009 | Abram et al. | |
| 2010/0263211 A1 | 10/2010 | Sahs et al. | |
| 2013/0233269 A1 | 9/2013 | Houtschilt et al. | |
| 2013/0299004 A1 | 11/2013 | Abram | |
| 2015/0027566 A1 | 1/2015 | Kobori | |

OTHER PUBLICATIONS

Robert Leroy Middleton Jr. and Justin Tyler Middleton, Passive Exhaust Valve Assembly and Forming Method, U.S. Appl. No. 15/015,299, filed Feb. 4, 2016.

\* cited by examiner

PASSIVE EXHAUST VALVE WITH FLOATING SPRING STOP

CROSS-REFERENCE TO RELATED APPLICATIONS

The present application claims benefit under 35 U.S.C. §119(e) of U.S. Provisional Application Ser. No. 62/387,411, entitled PASSIVE EXHAUST VALVE WITH FLOATING SPRING STOP, filed Dec. 24, 2015, which is hereby incorporated herein by reference in its entirety.

FIELD OF THE INVENTION

The present invention relates generally to the field of passive exhaust valves and methods of forming and assembling such valves.

BACKGROUND OF THE INVENTION

To control back flow pressure and reduce low frequency engine noise in exhaust systems of combustion engines, it is generally understood that a passive valve may be provided in the exhaust line to alter characteristics of exhaust flow by actuating in response to changes in exhaust pressure. Passive valves may regulate exhaust pressure and attenuate exhaust system noise, however, passive exhaust valve assemblies can also create other noises, such as, for example, harsh closure noises of a valve plate closing against an interior surface of a valve conduit, flutter noises of the valve plate flapping or fluttering between open and closed positions when experiencing exhaust pressure fluctuations or pulses, and squeaking noises of the valve plate pivoting between open and closed positions. As generally understood, these undesirable noises may also cause pre-mature wear and damage to the valve and other negative consequences to performance of the exhaust system.

SUMMARY OF THE PRESENT INVENTION

The present invention generally provides an exhaust conduit or pipe section that includes a valve plate or vane member that can pivot within the interior volume or flow path of the exhaust conduit to regulate the flow of exhaust gases through the exhaust conduit. The passive exhaust valve assembly includes a flexible bumper element, such as a metal mesh pad, which can be positioned on an interior surface of the exhaust conduit for an end portion of the valve plate to contact the bumper element for reducing or substantially eliminating closure noises and associated impact forces of the valve plate. Optionally, the bumper element may be partially disposed in a recessed pocket on the interior surface, such as generally out of the flow path of exhaust gases. Also, the bumper element may optionally be biased inward, such as with a spring, for the end portion of the valve plate to contact the bumper element as it moves toward the closed position, thereby gradually reducing the closure speed of the valve plate to the closed position. Further, the bumper element may be floating or movably engaged with the exhaust conduit.

In accordance with one aspect of the present invention, a passive exhaust valve assembly includes an exhaust conduit and a valve plate disposed within the exhaust conduit, whereby the valve plate is pivotal between an open position for allowing a flow of exhaust gases through the exhaust conduit and a closed position for reducing the flow of exhaust gases. A bumper element is disposed at a recessed pocket on an interior surface of the exhaust conduit. The bumper element is positioned for an end portion of the valve plate to contact the bumper element when pivoting toward the closed position.

In accordance with another aspect of the present invention, a passive exhaust valve assembly includes an exhaust conduit defining an interior flow path. A valve plate is operably disposed in the interior flow path and movable between open and closed positions. A bumper element is disposed at an interior surface of the exhaust conduit and arranged for the valve plate to contact the bumper element when pivoting toward the closed position. A spring is disposed between the interior surface of the exhaust conduit and the bumper element to bias the bumper element toward the valve plate.

In accordance with yet another aspect of the present invention, a method of forming a passive exhaust valve assembly includes providing an exhaust conduit having a removed section in a wall of the exhaust conduit. A valve plate is engaged within the exhaust conduit for the valve plate to be pivotal between an open position that allows a flow path of exhaust gases through the exhaust conduit and a closed position for restricting the flow path of exhaust gases. A cover member is attached over the removed section of the exhaust conduit to substantially surround the flow path. The cover member has a bumper element arranged for the valve plate to contact the bumper element when pivoting toward the closed position.

These and other objects, advantages, purposes and features of the present invention will become apparent upon review of the following specification in conjunction with the drawings.

DETAILED DESCRIPTION OF EMBODIMENTS

Figure 4:
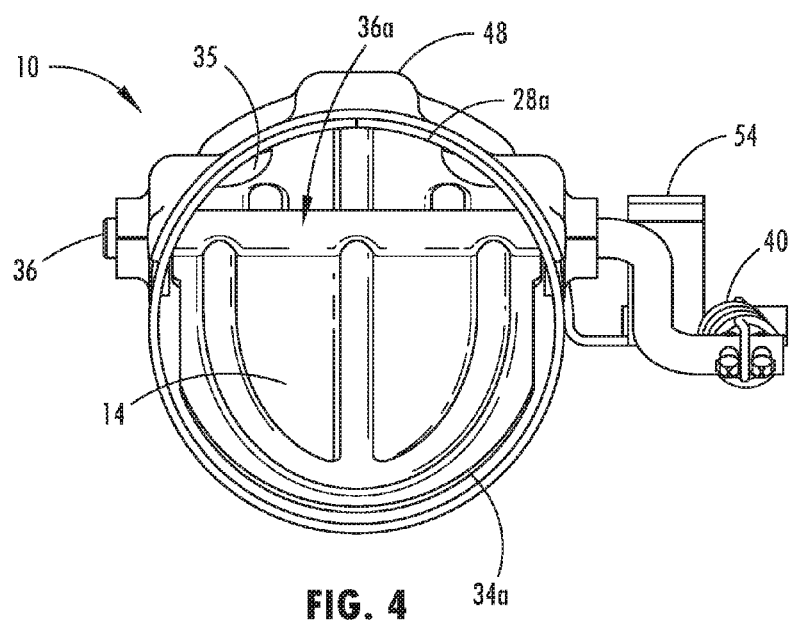
FIG. 4 is an end elevational view of the passive exhaust valve assembly shown in FIG. 1.
Figure 5:
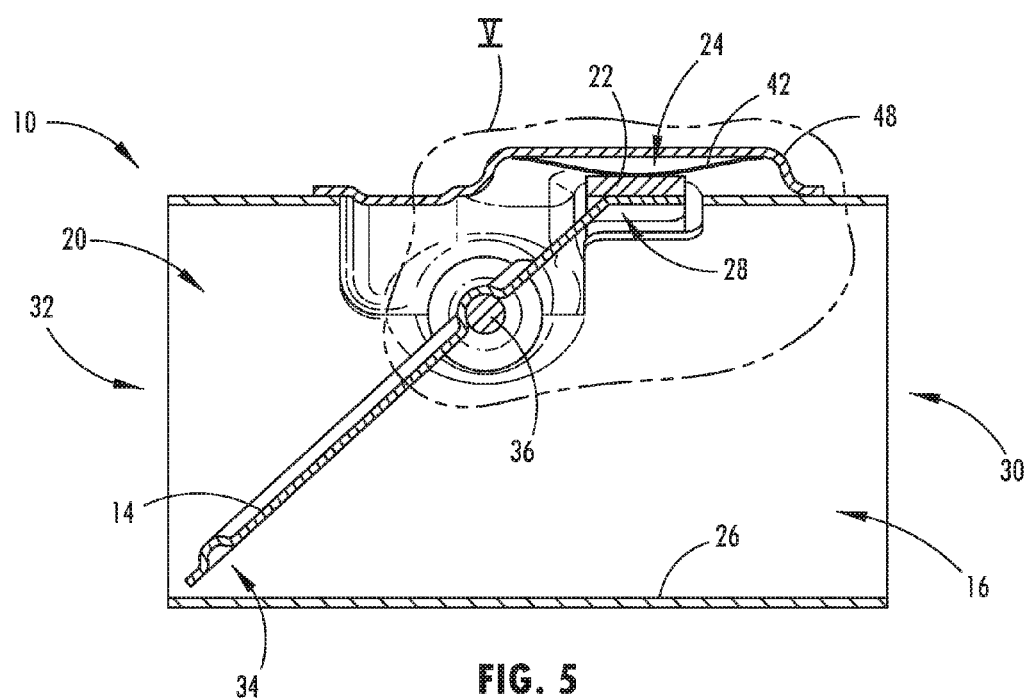
FIG. 5 is a cross-sectional view of the passive exhaust valve assembly, taken at section II-II shown in FIG. 2.
Figure 12:
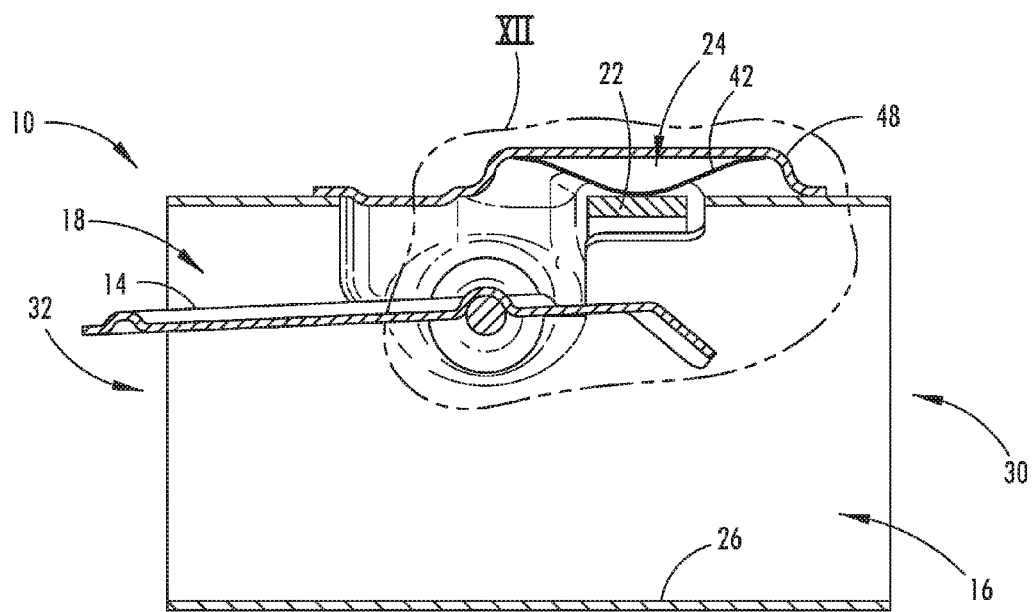
FIG. 12 is a cross-sectional view of the passive exhaust valve assembly, taken at section IX-IX shown in FIG. 9.

Referring now to the drawings and the illustrative embodiments depicted therein, a passive exhaust valve assembly 10 includes an exhaust conduit 12, such as tube or pipe, and a vane member or valve plate 14 (FIG. 4) that pivots within an interior section 16 or volume of the exhaust conduit 12 between a closed position 20 (FIG. 5) and an open position 18 (FIG. 12) to regulate the flow of exhaust gases through the exhaust conduit 12. The valve plate 14 is biased to the closed position 20 and pivots toward the open position 18 when the flow of exhaust gas generates enough pressure to overcome the biasing force about a pivotal axis of the valve plate 14, such as the biasing force provided by spring 40 shown in FIG. 1. A flexible bumper element, such as a metal mesh pad 22, is disposed at or on an interior surface 26 of the exhaust conduit 12 in a location to contact the valve plate 14 moving toward the closed position 20. For example, as shown in FIG. 5, the bumper element 22 may be disposed in a recessed pocket 24 or depression on the interior surface 26 of the exhaust conduit 12. With the bumper element 22 in this recessed location, an end portion 28 of the valve plate 14 contacts the bumper element moving toward and in the closed position 20 (FIG. 5) to reduce noise generated by the valve plate reaching the closed position, which without the bumper element may otherwise cause the valve plate or other parts to contact a rigid surface and generate a harsh closure noise when reaching or approaching the closed position.

Figure 1:
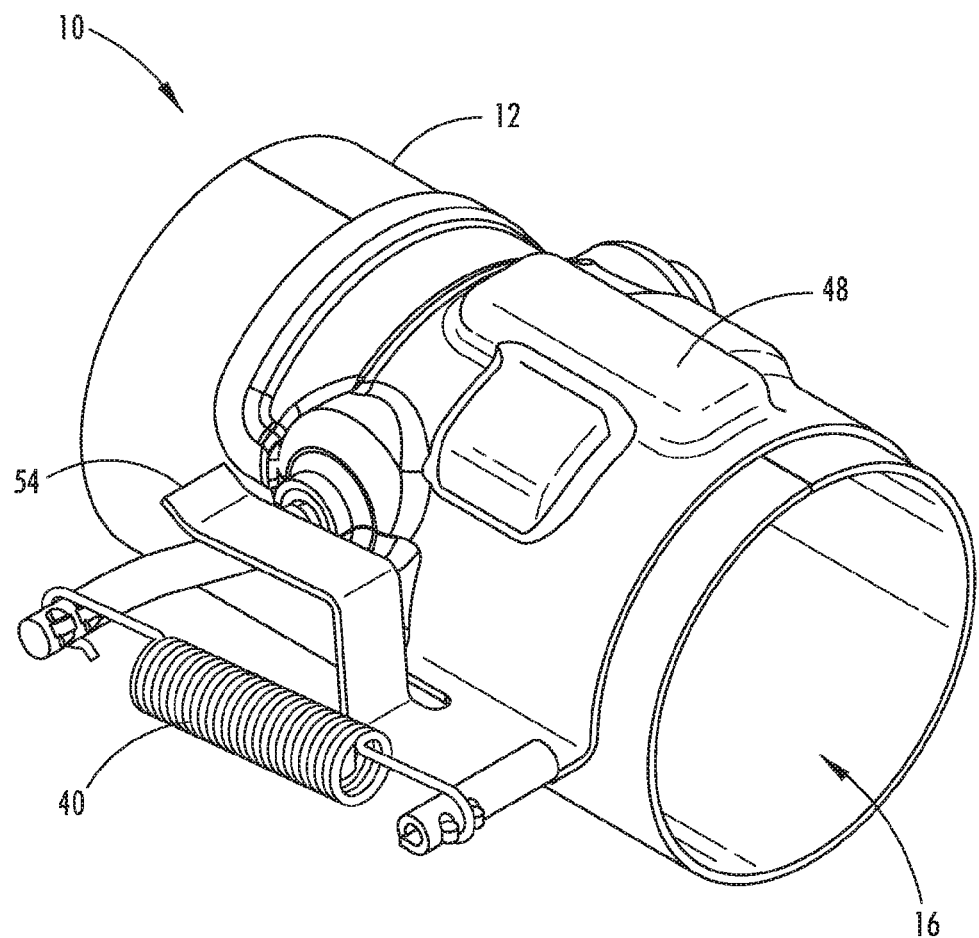
FIG. 1 is a upper perspective view of a passive exhaust valve assembly, in accordance with the present invention.
Figure 2:
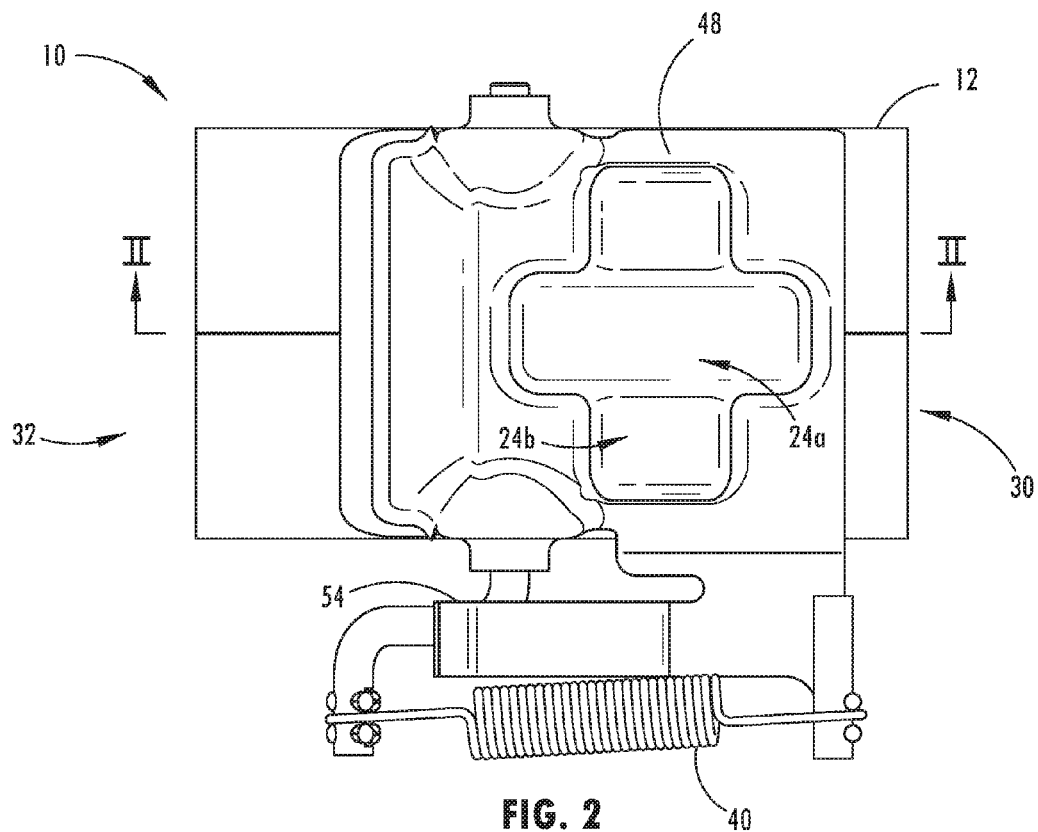
FIG. 2 is an top plan view of the passive exhaust valve assembly shown in FIG. 1.
Figure 3:
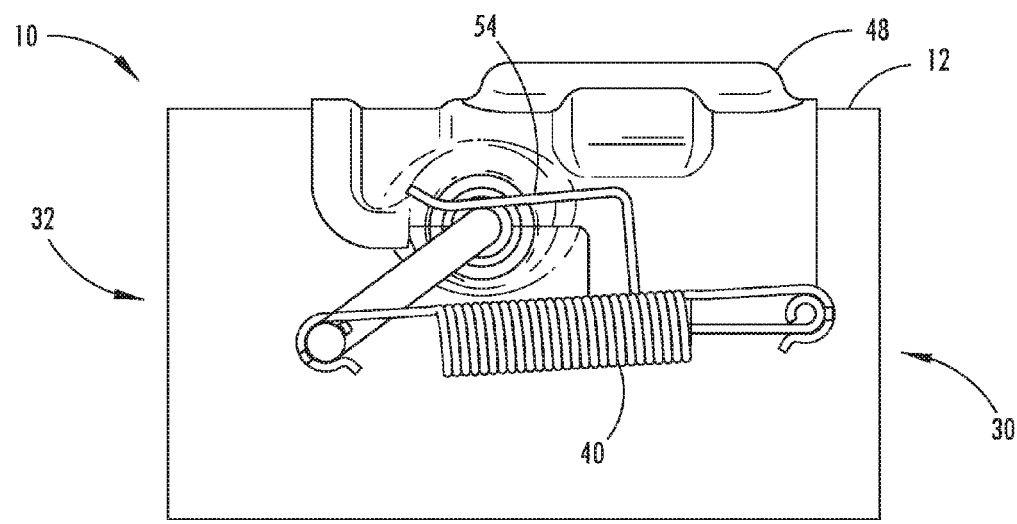
FIG. 3 is a side elevational view of the passive exhaust valve assembly shown in FIG. 1.

As shown in FIGS. 2 and 3, the exhaust conduit 12 of the passive exhaust valve assembly 10 includes openings at an inlet end 30 and an outlet end 32 on opposing ends of the exhaust conduit 12 to respectively receive and dispense exhaust gases longitudinally though the exhaust conduit 12. As illustrated in FIG. 1, the exhaust conduit 12 has an elongated tube or pipe shape with a curved exterior surface and a similarly curved interior surface that substantially surrounding a generally cylindrical interior volume. The interior volume of the exhaust conduit defines a flow path along the longitudinal axis of the exhaust conduit, which extends generally through the interior volume of the exhaust conduit 12 between the inlet and outlet ends 30, 32. The valve plate 14 is positioned within the flow path of the internal volume and is pivotal relative to the exhaust conduit 12 between an open position 18 and a closed position 20 for preventing exhaust gases from transferring through the tubular conduit. Although shown as a tubular shape, it is conceivable that the exhaust conduit 12 in additional embodiments may have a different shape, such as a shape with a non-circular cross-section and/or a shape that is non-linear in the longitudinal direction.

The valve plate 14 is operably coupled within the interior section of the exhaust conduit 12 and is pivotal between the open position 18 (FIG. 12), where the body portion of the valve plate 14 is generally parallel with the exhaust flow path to provide a minimized resistance to the exhaust flow, and the closed position 20 (FIG. 5), where the body portion of the valve plate is at an angle that substantially reduces flow of exhaust gases through the exhaust conduit to provide a maximized resistance to the exhaust flow. As shown in FIGS. 4 and 5, the illustrated valve plate 14 has a length between the upper and lower arcuate edges 28a, 34a that is greater than the inside diameter of the exhaust conduit 12, such that the valve plate 14 is oriented an angle less than ninety degrees in the closed position 20. The valve plate 14 has a pivotal axis that is generally defined by the pivot shaft or rod 36 that supports the valve plate 14 within the conduit. The pivotal axis of the valve plate 14 generally divides the length of the valve plate to define end portions on opposing sides of the pivotal axis. The first end portion 28 of the valve plate contacts the bumper element 22 in the close position 20, such as by moving toward and abutting the bumper element 22 in the recessed pocket 24, as shown in FIG. 5. The opposing second end portion 34 of the valve plate, as shown in FIGS. 4 and 5, has its lower arcuate edge 34a is spaced from the interior surface 26 of the exhaust conduit in the closed position 20, thereby preventing direct contact between edges of the valve plate 14 and the interior surface 26 of the exhaust conduit 12, which may allow small amounts of exhaust gases to pass by the valve plate in the closed position. This spacing at the lower arcuate edge 34a, along with gaps 35 (FIG. 4) near the outside edges of the first end portion 28 of the valve plate, can have the tendency to reduce flutter of the valve plate, which may be caused by exhaust pressure fluctuations or pulses.

The body portion of the valve plate 14 may be coupled with the pivot shaft or rod 36 that defines the pivotal axis of the valve plate 14. The pivotal axis is generally perpendicular relative to the exhaust flow path, and, as shown in FIG. 4, may be off-center within the exhaust conduit to define a longer portion of the valve plate at the second end portion 34, and a shorter portion of the valve plate at the first end portion 28. As illustrated, an internal section 36a of the pivot rod 36 extends through the exhaust conduit and attaches to and supports the valve plate 14. The end portions of the internal section pivotally engage the axle supports, which may include bushings 38 (FIG. 8), on opposing sidewalls of the tubular conduit to provide rotational movement of pivot rod 36. The intermediate portion of the pivot rod, between the opposing ends of the internal section 36a, is rigidly coupled with the valve plate 14, such that rotation of the pivot rod 36 operates the valve plate 14 between the open and closed positions. Accordingly, the valve plate 14 may be biased about the pivotal axis to the closed position by an external spring 40 coupled between the pivot rod 36 and an exterior area of the exhaust conduit 14, as shown in FIGS. 1-4. However, it is contemplated that a different spring or biasing device may be alternatively arranged in additional embodiments, such as on the interior of the exhaust conduit, to similarly bias the valve plate in the open or closed position.

When the valve plate 14 moves toward the closed position 20, the end portion 28 of the valve plate 14 contacts the bumper element 22 to slow and eventually cease pivotal movement of the valve plate 14 in the closed position 20. To facilitate reducing the closure speed of the valve plate 14, the bumper element 22 may optionally be biased inward and toward the portion of the valve plate that contacts the bumper element. In the illustrated example, the mesh pad of the bumper element 22 is resiliently biased inward toward the central axis of the exhaust conduit 12 for the end portion 28 of the valve plate 14 to contact the bumper element 22 as it moves toward the closed position 20, and thereby gradually reduces the closure speed of the valve plate 14 to the closed position, further attenuating closure noises. The bumper element may be biased with an integral feature, such as a resilient mesh, or with a separate component, such as a spring 42, as shown FIG. 5. The illustrated spring 42 is as a resilient leaf spring, but may be several types of springs, such a coiled compression spring, washer spring, or air spring or the like.

Figure 6:
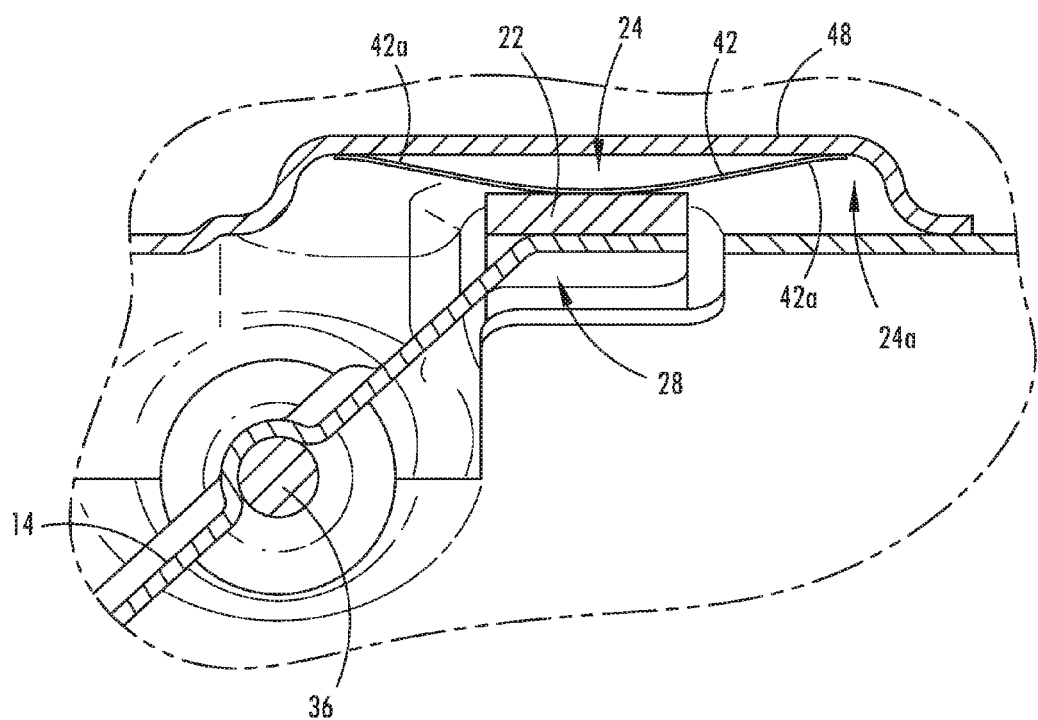
FIG. 6 is an enlarged view of a section of the passive exhaust valve assembly shown in the outlined area designated as section V shown in FIG. 5.
Figure 13:
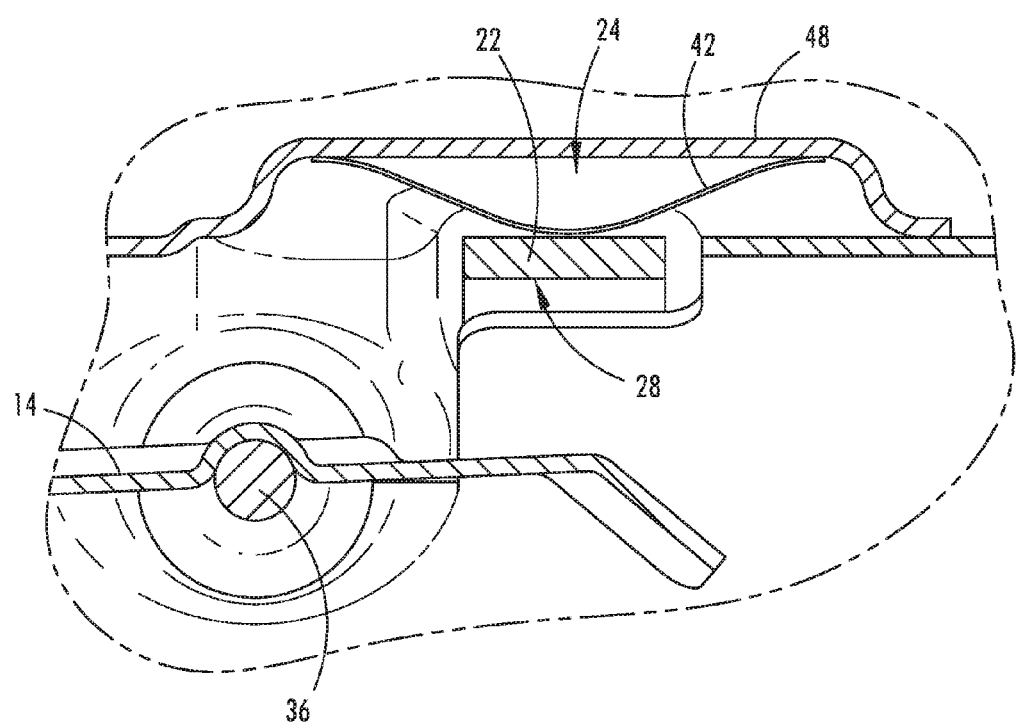
FIG. 13 is an enlarged view of a section of the passive exhaust valve assembly shown in the outlined area designated as section XII shown in FIG. 12.

As shown in FIG. 5, the illustrated spring 42 is generally engaged between a cover portion of the exhaust conduit 14 and the mesh pad of the bumper element 22 to bias the bumper element inward and away from the recessed pocket 24 and to absorb energy from the valve plate 14 impacting the bumper element 22 when moving toward the closed position 14. Specifically, the spring is engaged in the recessed pocket of the exhaust conduit, with the ends 42a of the leaf spring 42 contacting the interior edge portions 24a of the recessed pocket 24 (FIG. 6). The illustrated spring 42 is oriented with its elongated extent in generally parallel alignment with the exhaust flow path and an intermediate portion of the spring contacting the mesh pad proximate a contact portion 22a of the mesh pad. As illustrated in FIGS. 6 and 13, the spring 42 is shown in a compressed position (FIG. 6), with the valve plate in the closed position 20 and contacting the mesh pad 22 and upon an increase in pressure or flow of exhaust against the second portion 34 of the valve plate 14, the valve plate pivots away from the bumper element to move the spring 42 to an extended position (FIG. 13), with the valve plate in the open position 18 or otherwise not in contact with the mesh pad 22. When the exhaust pressure or flow is reduced, the bias on the valve plate draws the valve plate 14 toward the closed position 20, where upon contact with the illustrated bumper element 22, the bumper element 22 flexes toward the recessed pocket 24 against the biasing force of the spring 42.

Figure 7:
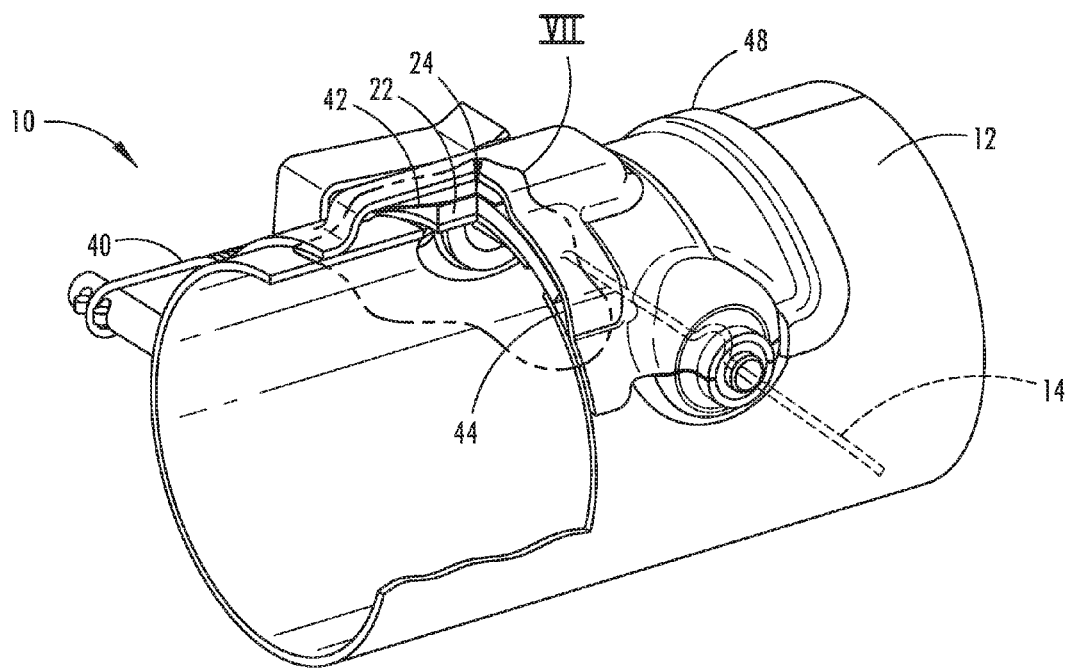
FIG. 7 is an upper perspective view of the passive exhaust valve assembly shown in FIG. 1, taken from an opposite side and having a cutaway section to show a bumper element with a valve plate in a closed position.
Figure 7A:
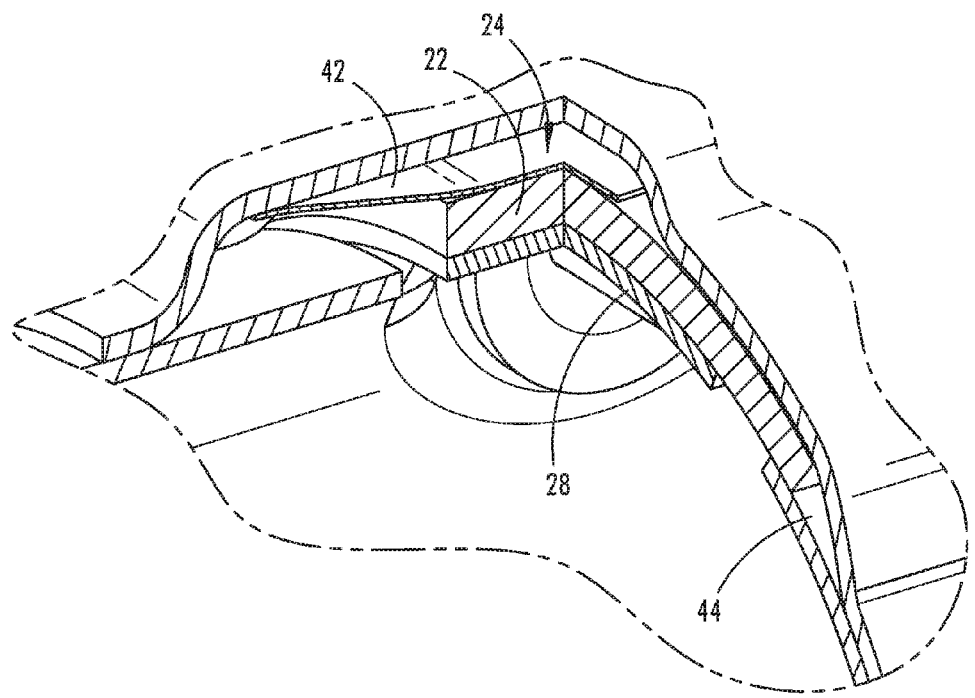
FIG. 7A is an enlarged view of the cutaway section of the passive exhaust valve assembly shown in the outlined area designated as section VII shown in FIG. 7.
Figure 7B:
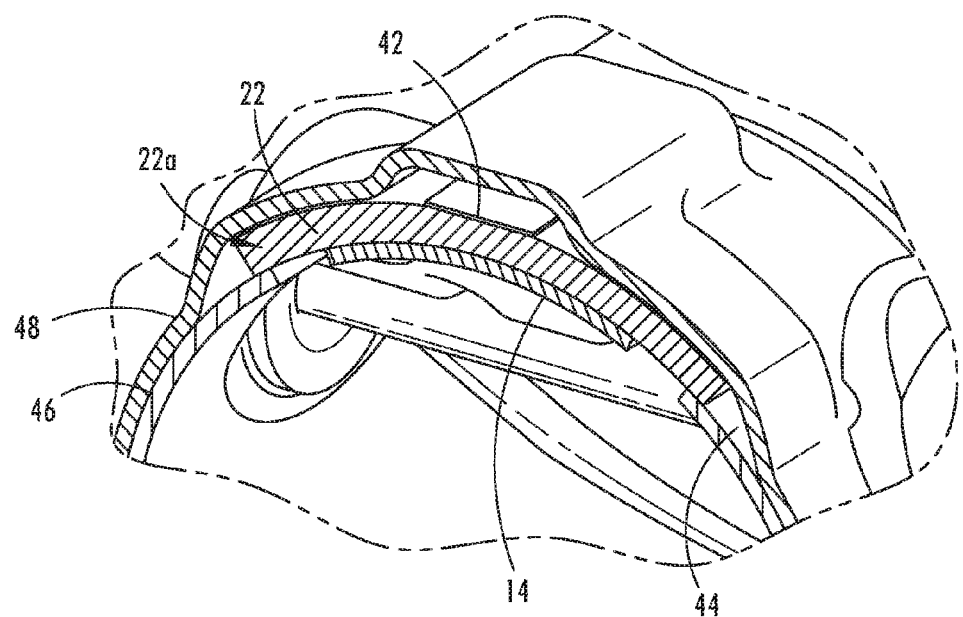
FIG. 7B is an upper perspective cross-sectional view of the passive exhaust valve assembly shown in FIG. 7, showing a bumper element movably engaged at opposing ends.
Figure 14:
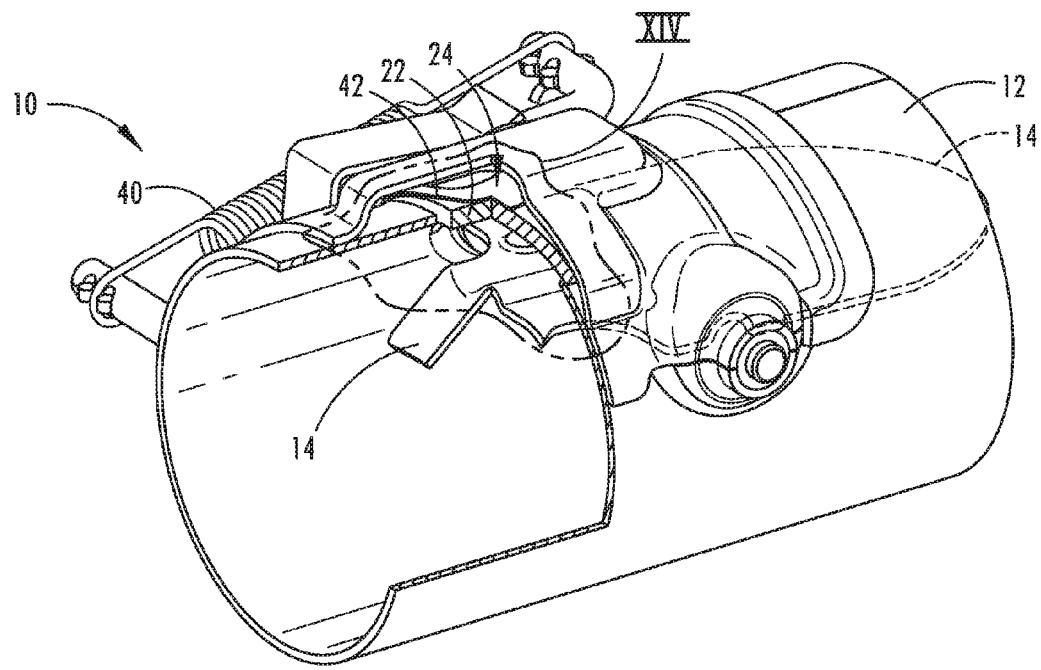
FIG. 14 is an upper perspective view of the passive exhaust valve assembly shown in FIG. 9, having a cutaway section to show the bumper element with the valve plate in the open position.
Figure 14A:
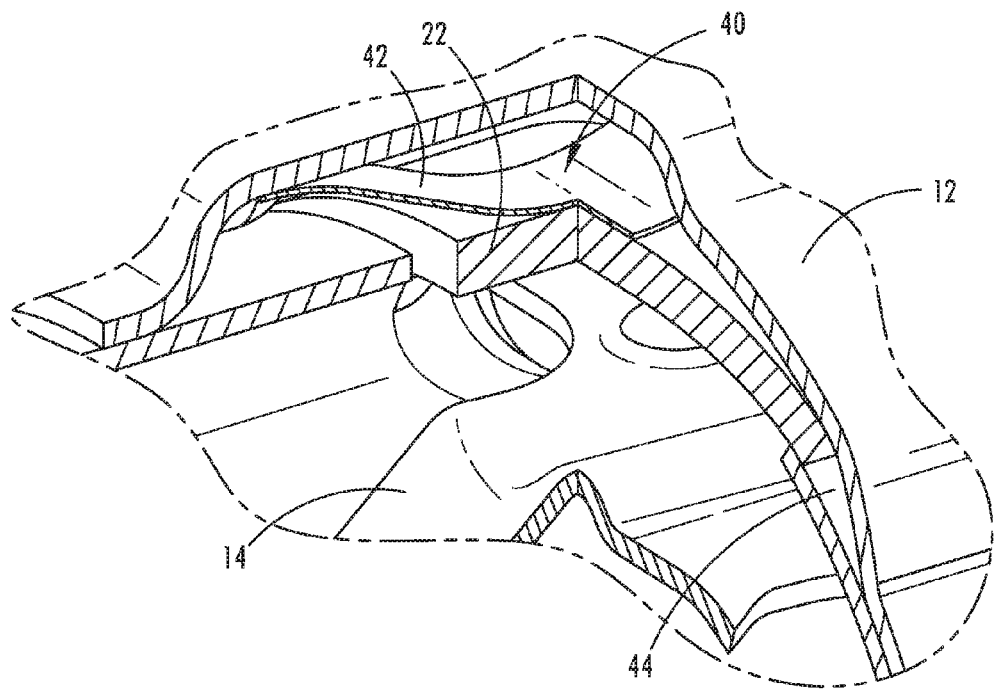
FIG. 14A is an enlarged view of the cutaway section of the passive exhaust valve assembly shown in the outlined area designated as section XIV shown in FIG. 14.
Figure 14B:
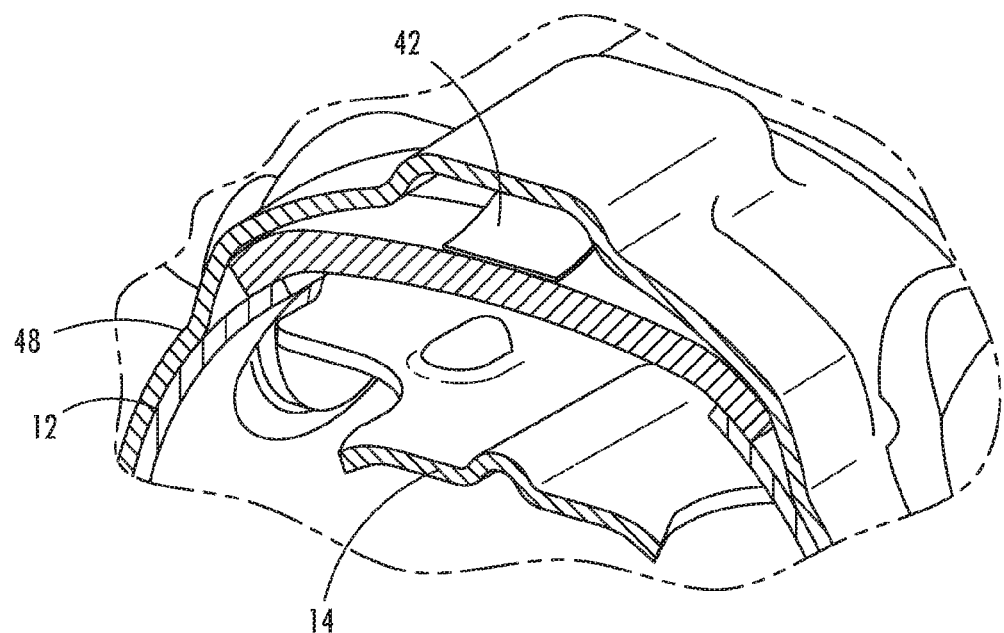
FIG. 14B is an upper perspective cross-sectional view of the passive exhaust valve assembly shown in FIG. 14, showing a bumper element movably engaged at opposing ends.

The bumper element 22 may be floating or movably engaged within the recessed pocket 24 of the exhaust conduit 12 to allow for movement bumper element 22 relative to the exhaust conduit 12 when moving between the compressed position (FIG. 6) and the extended position (FIG. 13). The movement between the compressed and extended positions of the spring, may be defined as a resilient range or distance of the bumper element 22, such that the bumper element 22 guides and reduces closure speed when the valve plate 14 moves toward the closed position after first contacting the mesh pad. However, it is also contemplated that the bumper element may also be fixedly coupled with the exhaust conduit, such as by welding or high temperature adhesives. As shown in FIG. 7B, the mesh pad 22 is oriented generally perpendicular to the exhaust flow path, such that it has a curvature generally corresponding to the curvature of the interior surface 26 (FIG. 5) of the exhaust conduit. This can also be seen in FIG. 14B, whereby, in the open position 18, the intermediate portion of the mesh pad 22 protrudes inward into the cylindrical shaped interior volume of the exhaust conduit 12, which is facilitated by the inward biasing force of the leaf spring 42.

Figure 7C:
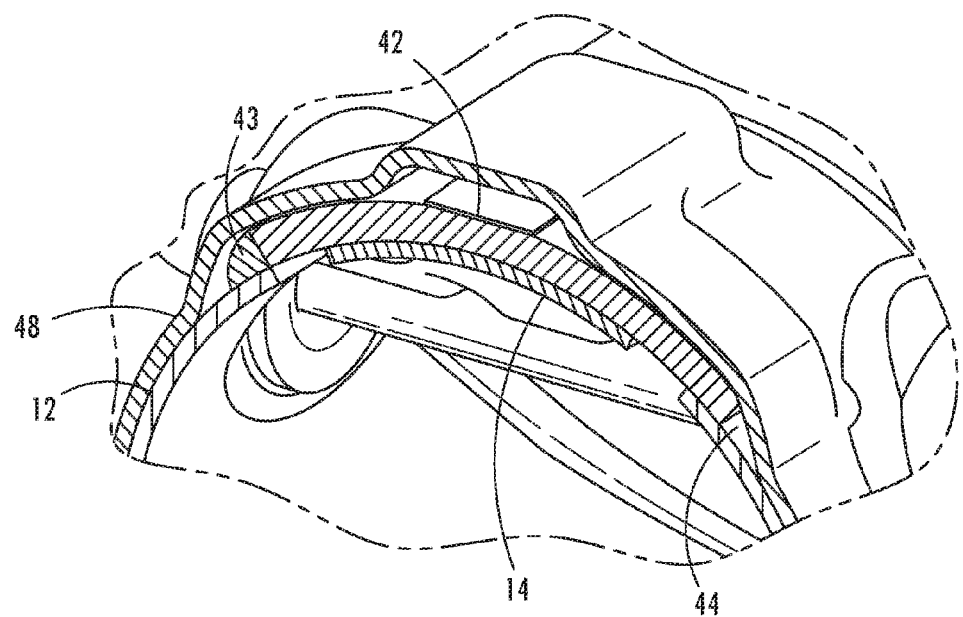
FIG. 7C is an upper perspective cross-sectional view of an additional embodiment of a passive exhaust valve, showing a bumper element fixed at one end and movably engaged at the opposing end.
Figure 14C:
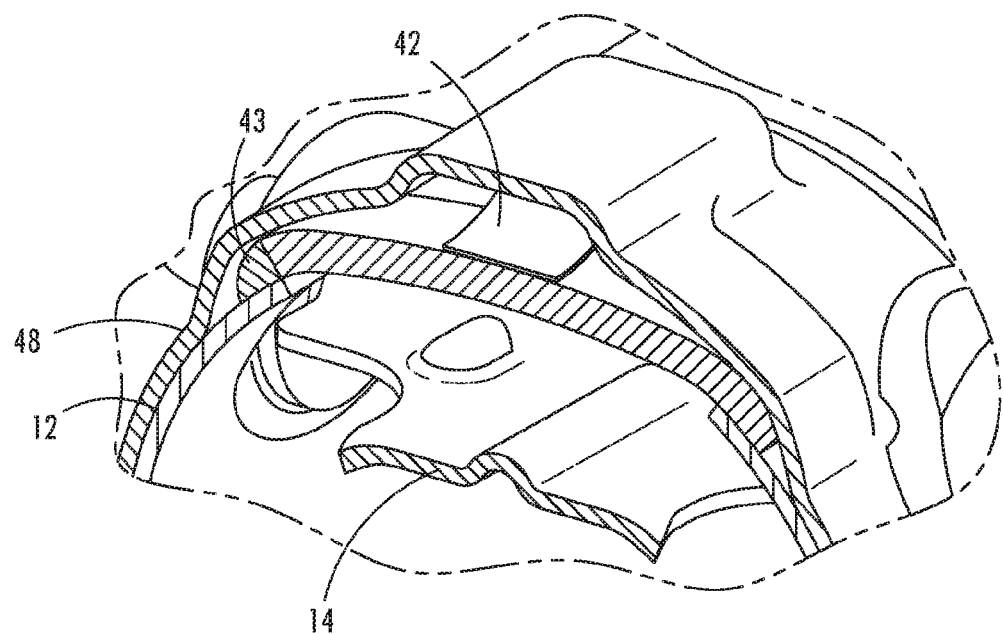
FIG. 14C is an upper perspective cross-sectional view of an additional embodiment of a passive exhaust valve, showing a bumper element fixed at one end and movably engaged at the opposing end.

The floating or movable engagement of the mesh pad 22 with the exhaust conduit allows the mesh pad 22 to have a greater range of resiliency with the spring 42. As best illustrated in FIGS. 7-7B, an example of providing such moveable engagement of the mesh pad is by the end portions 22a of the mesh pad 22 to be loosely or movably engaged in a channel 44, which can, for example, be provided between overlapping sections of the exhaust conduit 12. In the illustrated embodiment, the exhaust conduit includes a pipe section 46 and a cover member 48 attached over an aperture 50 in a sidewall of the pipe section 46. The cover member 48 is shown with the recessed pocket 24 or depression that is provided on the interior surface of the exhaust conduit for the bumper element. The recessed pocket 24 as illustrated in FIG. 2 includes a longitudinal portion 24a for the spring that is depressed away from the exhaust flow path further than a lateral portion 24b of the recessed pocket 24 that is provided for holding the end portions of the mesh pad 22. As shown in FIG. 7A, the lateral portion 24b of the recessed pocket 24 extends beyond the edge that defines opening 50 in the sidewall of the pipe section to provide the channel for movable engagement with the mesh pad. Although the mesh pad is shown coupled or contacting to the spring without an attachment interface, it is contemplated that the bumper element may be fixedly attached to the spring. Although shown slidably or movably engaged in the channels 44 in FIGS. 7B and 14B, in an additional embodiment shown in FIGS. 7C and 14C a single end portion of the bumper element may be fixed, such as via a weld 43, to the channel 44, allowing the opposing free end portion of the mesh pad to move in the channel when spring moves the bumper element between the extended and compressed positions.

Figure 8:
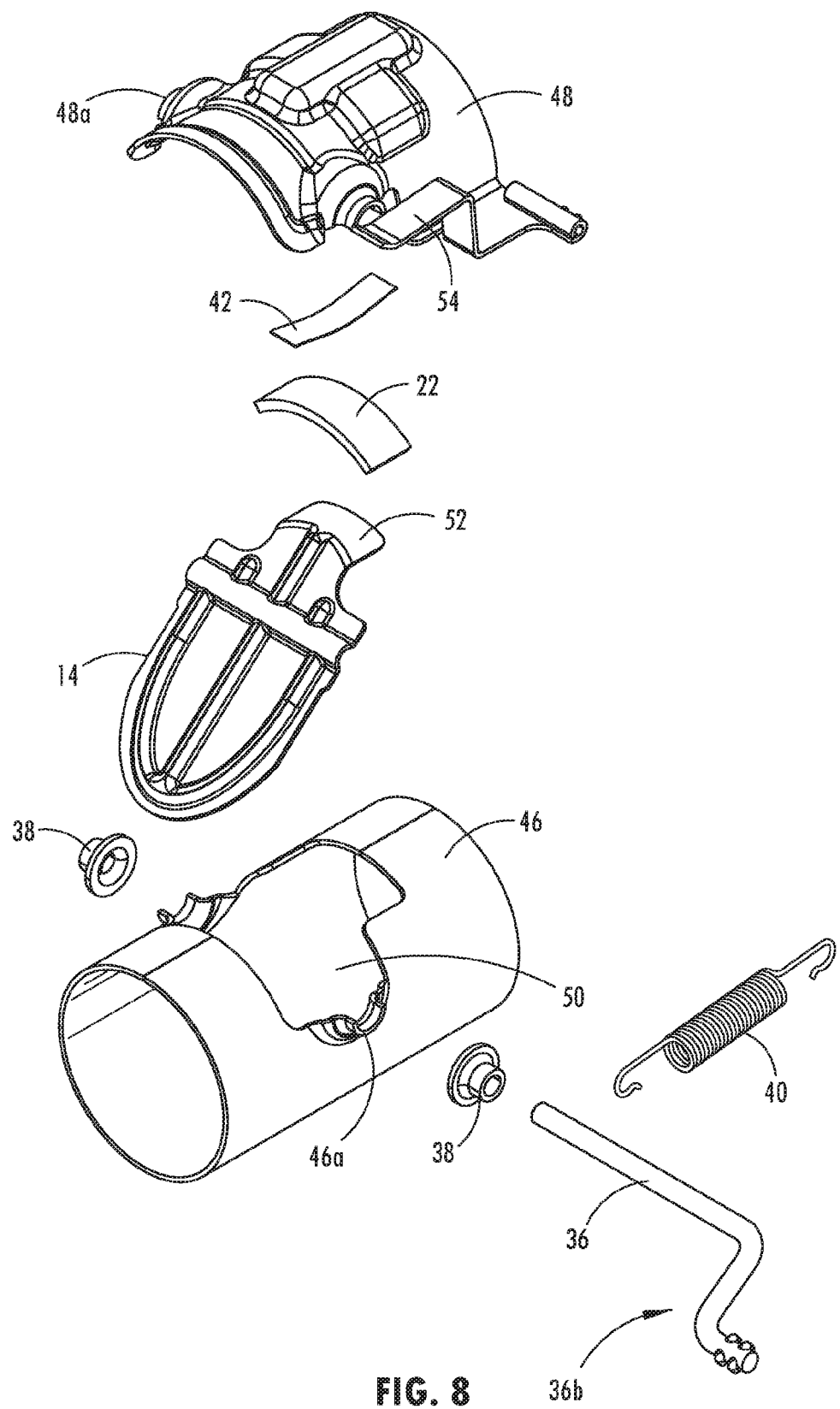
FIG. 8 is an exploded upper perspective view of the passive exhaust valve assembly shown in FIG. 1.

For the bumper element to contact a greater surface area than the edge of the valve plate would otherwise provide, the first end portion 28 of the valve plate 14 may also include a stop member 52 protruding from a body portion of the valve plate. As illustrated in FIG. 8, the stop member 52 is angled from the body portion and shaped to have a curved upper surface for contacting the mesh pad 22, such that the shape and orientation of the stop member 52 in the closed position may generally align with the curvature of the exhaust conduit 12. The curved shape of the stop member 52 also provides a larger surface area on the upper surface of the stop member to contact the bumper element 22 in the closed position and reduce the associated closure noise.

Although the illustrated example shows the exhaust conduit provided with the cover member 48 attached around the aperture 50 in the sidewall of the pipe section 46, it is also contemplated that the valve assembly 10 may be made differently, such as by including two pipe sections that attach together to form the exhaust conduit and conceal the valve plate on the interior section. As shown, the cover member 48 substantially conceals the aperture 50 and has a curved shape between opposing lateral sides of the cover member 48 that substantially aligns with a curved shape of the pipe section 46. More specifically, the cover member 48 has a peripheral flange that engages the edge of the aperture 50 in the sidewall of the pipe section 46, thereby substantially concealing the aperture. Engagement of the cover member 48 to the pipe section 48 may be provided by welding or high temperature adhesives or other generally known methods.

As shown in FIG. 8, the opposing lateral sides of the cover member 48 in the illustrated embodiment are provided with upper embossed indentations 48a with a rounded interior surface configured to contain and support the pivot rod 36. The upper embossed indentations 48a on the cover member 48 are aligned and mated with corresponding lower embossed indentations 46a in the sidewall of the pipe section 46, formed on edges of the aperture 50. The upper and lower embossed indentations 48a, 46a together form a pair of axle supports on opposing sides of the exhaust conduit 12 for supporting and rotatably engaging the pivot rod 36. In the illustrated embodiment, the axle supports include bushings 38 that engage between the pivot rod 36 and the upper and lower embossed indentations for reducing friction and noise from the rotation of the pivot rod 36. The bushings 38 may include one or a combination of metal alloys, such as steel mesh, bronze, iron, ceramics, and composite materials, such as those containing carbon fibers and polymers. The bushings 38 may include a metal wire mesh, a solid sleeve, or a combination of materials to provide a relatively low friction surface for rotation of the pivot rod 36. Preferably the bushings 38 include metal wire mesh that is coated, compacted, adhered to, or otherwise integrated with a graphite material to provide additional friction resistance against the pivot shaft or rod 36. Specifically, a graphite powder may be compacted into the pores of the wire mesh before, after, or during the forming process of shaping the wire mesh into the bushing 38. In additional embodiments, it is contemplated that the axle supports may not include separate bushings or that the bushings may be integrally formed with the axle supports. It is also conceivable that the embossed indentations in other embodiments may be differently shaped and configured to be contained on more or less of the cover member 48 or the sidewall of the exhaust conduit 12.

Optionally, the pivot rod 36 may have an external section 36b, such as shown in FIG. 8, that is configured to stop the valve plate in the open and/or closed positions, such as by contacting a portion of the stop feature 54 on cover member 48. As illustrated, the external section 36b of the pivot rod angles perpendicularly from the internal section 36a of the pivot rod 36. A distal end portion of the external section 36b angles again perpendicularly in parallel alignment with the internal section 36a of the pivot rod 36 to define a spring attachment point. A tension spring 40 may thereby be secured to the spring attachment point, which includes radial protrusions from the distal end portion on opposing sides of the spring to prevent the spring from sliding laterally and disengaging from the spring attachment point on the spring arm. The external section 36b of the pivot rod 36 is thereby shown to have an L-shape formed with the distal end portion. It is contemplated, however, that the external section of the pivot rod may be alternatively shaped or angled to otherwise provide a spring attachment point sufficient to attach a tension spring.

As shown in FIGS. 1-3, an opposing end of the tension spring 40 is attached to a spring anchor that is fixed relative to the exhaust conduit 12, such that the tension spring 40 biases the external section of the pivot rod 36 in a direction that rotationally positions the valve plate toward the closed position. The spring anchor may be arranged in several ways on the exhaust conduit, such as a separate feature or integral with another component, such as an integral piece of the cover member 48, as shown in FIG. 1. In the illustrated embodiment an extension flange protrudes from the peripheral flange on one lateral side of the cover member 48 proximate the external section of the pivot rod 36. The spring anchor is formed on an end of the flange. The spring anchor may be formed by rolling the second end of the flange, as shown in FIG. 3.

Figure 9:
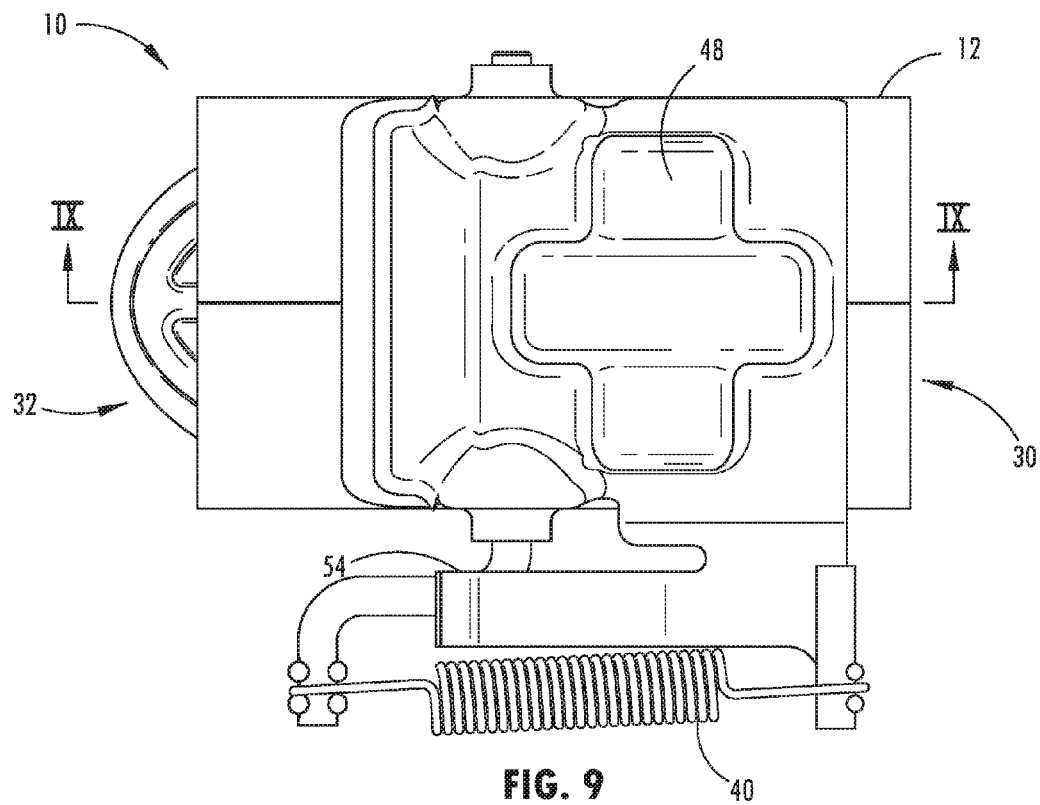
FIG. 9 is a top plan view of the passive exhaust valve assembly shown in FIG. 1, showing the valve plate in an open position.
Figure 10:
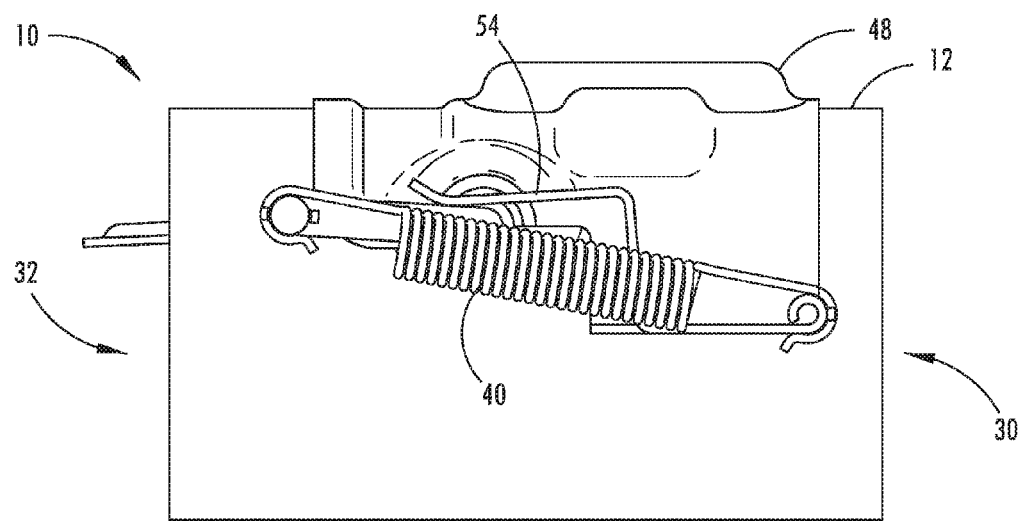
FIG. 10 is a side elevational view of the passive exhaust valve assembly shown in FIG. 9.
Figure 11:
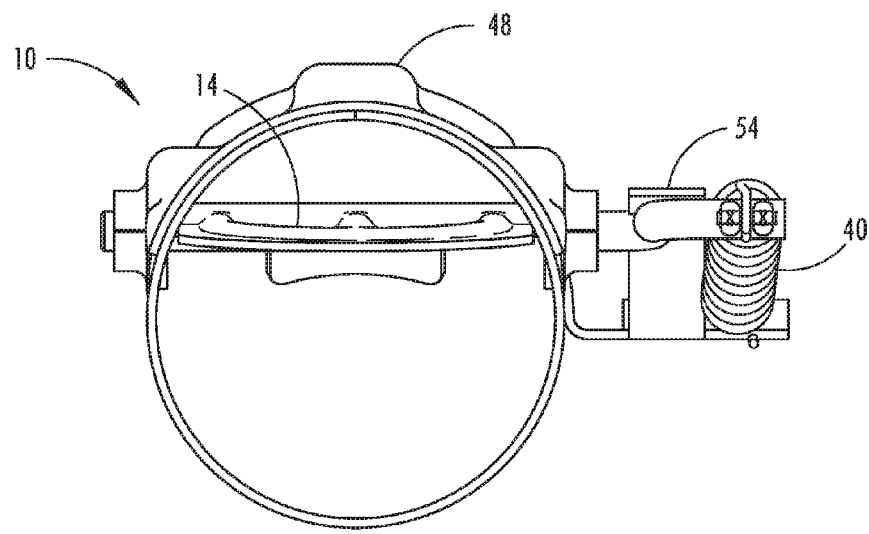
FIG. 11 is an end elevational view of the passive exhaust valve assembly shown in FIG. 9.

To stop rotation of the pivot rod at an angle that corresponds with the open position of the valve plate a stop feature may also be provided separately or integrally with the exhaust conduit. As illustrated in FIGS. 9 and 10, the stop feature 54 includes a tab that angles rearward to an angle that abuts the external section of the pivot rod 36 with the valve plate 14 in the open position 18. As such, the stop feature 54 in the depicted embodiment is an integral piece of the cover member 48, and is formed to provide a resilient spring effect when the pivot rod contacts the tab. The tab thereby may be configured to abut the external section of the pivot rod in a manner that reduces noise associated with the valve plate 14 moving to the open position. It is contemplated that additional embodiments of the tab may include features for strengthening and increasing rigidity of the stop feature, and further other embodiments of the stop feature may be formed with a multitude of different shapes and configurations for abutting the pivot rod to control the positioning of the valve plate.

As generally understood, generated exhaust pressure may increase or decrease with changes in engine speed, and control of the exhaust pressure by the exhaust system may, for example, have positive effects on engine performance and fuel consumption. When exhaust pressure from the inlet end 30 of the exhaust conduit 12 is sufficient to overcome the biasing force of the tension spring 40, the external section of the pivot rod 36 rotates toward from the stop feature 54 and pivots the valve plate 14 in the internal volume toward the open position 18. The biasing force of the tension spring 40 may increase as the valve plate 14 opens and the tension spring 48 stretches. The exhaust pressure from the inlet end 30 of the exhaust conduit 12 may likewise be released as the valve plate 14 opens. As such, in operation it is contemplated that the passive valve assembly may be coupled with a muffler or other exhaust system component having a pipe coupled with the outlet end 32 of the exhaust conduit 12 and a passage extending to at least one muffler chamber upstream from the inlet opening. In such an arrangement, with the valve plate 14 in the closed position 20, the exhaust gases will be restricted from passing through the valve assembly and urged to enter the at least one muffler chamber before exiting the muffler. When the exhaust pressure exceeds a threshold corresponding with the biasing force of the tension spring 40, the valve plate 14 may pivot to the open position 18 to release the pressure by allowing the exhaust to exit the muffler via the through pipe, avoiding the at least one muffler chamber.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

For purposes of this disclosure, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in this specification are simply exemplary embodiments of the inventive concepts defined in the appended claims. Hence, specific dimensions and other physical characteristics relating to the embodiments disclosed herein are not to be considered as limiting, unless the claims expressly state otherwise.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature; may be achieved with the two components (electrical or mechanical) and any additional intermediate members being integrally formed as a single unitary body with one another or with the two components; and may be permanent in nature or may be removable or releasable in nature, unless otherwise stated.

Changes and modifications in the specifically-described embodiments may be carried out without departing from the principles of the present invention, which is intended to be limited only by the scope of the appended claims as interpreted according to the principles of patent law including the doctrine of equivalents.

What is claimed is:

1. A passive exhaust valve assembly, comprising:
   an exhaust conduit;
   a valve plate disposed within the exhaust conduit and pivotal between an open position for allowing a flow of exhaust gases through the exhaust conduit and a closed position for reducing the flow of exhaust gases;
   a bumper element disposed at a recessed pocket on an interior surface of the exhaust conduit, wherein the bumper element is positioned for an end portion of the valve plate to contact the bumper element when pivoting toward the closed position; and
   wherein the bumper element is biased away from the recessed pocket, such that the bumper element flexes toward the recessed pocket when the valve plate moves toward the closed position.

2. The passive exhaust valve assembly of claim 1, wherein the bumper element includes a portion that is movably engaged in a channel disposed at or near the recessed pocket.

3. The passive exhaust valve assembly of claim 1, wherein the bumper element comprises a metal mesh pad.

4. The passive exhaust valve assembly of claim 1, further comprising:
   a spring disposed at the recessed pocket between the exhaust conduit and the bumper element to bias a contact portion of the bumper element away from the recessed pocket and to absorb energy from the valve plate impacting the contact portion of the bumper element.

5. The passive exhaust valve assembly of claim 4, wherein the spring comprises a leaf spring element having end sections disposed at the interior surface of the conduit and a central section biasing the contact portion of the bumper element away from the recessed pocket.

6. The passive exhaust valve assembly of claim 1, wherein the recessed pocket on the interior surface of the exhaust conduit protrudes radially from a generally cylindrical interior volume of the exhaust conduit.

7. The passive exhaust valve assembly of claim 1, wherein an end portion of the bumper element is movable relative to the exhaust conduit, such that the end portion moves to permit the bumper element to flex toward the recessed pocket upon contact with the valve plate moving toward the closed position.

8. The passive exhaust valve assembly of claim 1, wherein a first portion of the exhaust conduit attaches at a second portion of the exhaust conduit to define an overlapping section at or near the recessed pocket, and wherein the bumper element is movably engaged at the overlapping section.

9. The passive exhaust valve assembly of claim 8, wherein the bumper element comprises a mesh pad having a spring biasing a contact portion of the bumper element away from the recessed pocket, and wherein the contact portion of the bumper element flexes toward the recessed pocket upon contact with the valve plate moving toward the closed position.

10. A method of forming a passive exhaust valve assembly, comprising:
    providing an exhaust conduit having a removed section in a wall of the exhaust conduit;
    engaging a valve plate within the exhaust conduit for the valve plate to be pivotal between an open position that allows a flow path of exhaust gases through the exhaust conduit and a closed position for restricting the flow path of exhaust gases;
    attaching a cover member over the removed section of the exhaust conduit to substantially surround the flow path, the cover member having a bumper element arranged for the valve plate to contact the bumper element when pivoting toward the closed position;
    wherein the bumper element resiliently flexes away from the flow path upon contact with the valve plate moving toward the closed position; and
    wherein a portion of the bumper element is movably engaged with at least one of the exhaust conduit and the cover member, such that the portion moves relative to the exhaust conduit and the cover member when the bumper element flexes away from the flow path.

11. The method of claim 10, wherein the cover member includes a spring disposed between an interior surface of the cover member and the bumper element to bias the bumper element toward the valve plate.

12. The method of claim 10, wherein the bumper element comprises a mesh pad that is disposed in a recessed pocket on an interior surface of the cover member, and wherein the bumper element resiliently flexes toward the recessed pocket upon contact with the valve plate moving toward the closed position.

13. The method of claim 10, wherein the cover member and the exhaust conduit form an overlapping section, the end portion of the bumper element movable engaged with the overlapping section, such that the end portion moves when the bumper element flexes away from the flow path.

14. A passive exhaust valve assembly, comprising:
    an exhaust conduit defining an interior flow path;
    a valve plate operably disposed in the interior flow path and movable between open and closed positions;
    a bumper element disposed at an interior surface of the exhaust conduit and arranged for the valve plate to contact the bumper element when pivoting toward the closed position;
    a spring disposed between the interior surface off the exhaust conduit and the bumper element to bias the bumper element toward the valve plate; and
    wherein an end portion of the bumper element is movable relative to the exhaust conduit, such that the end portion moves to permit the bumper element to resiliently flex toward the interior surface upon contact with the valve plate moving toward the closed position.

15. The passive exhaust valve assembly of claim 14, wherein the spring is arranged in a recessed area of the interior surface of the exhaust conduit that protrudes away from the interior flow path.

16. The passive exhaust valve assembly of claim 14, wherein the bumper element comprises a metal mesh pad.

17. The passive exhaust valve assembly of claim 14, wherein the valve plate includes a stop member angled from a body portion of the valve plate, the stop member configured to contact the bumper element in the closed position.

18. The passive exhaust valve assembly of claim 14, wherein the end portion of the bumper element is movably engaged at a channel in the exhaust conduit, such that the end portion moves when a contact portion of the bumper element flexes away from the flow path.

19. The passive exhaust valve assembly of claim 18, wherein a cover member attaches at a wall of the exhaust conduit and extends over an aperture in the wall, wherein the cover member and wall form an overlapping section that provides the channel movably engaged by the end portion of the bumper element.

20. A passive exhaust valve assembly, comprising:
an exhaust conduit;
a valve plate disposed within the exhaust conduit and pivotal between an open position for allowing a flow of exhaust gases through the exhaust conduit and a closed position for reducing the flow of exhaust gases;
a bumper element disposed at a recessed pocket on an interior surface of the exhaust conduit, wherein the bumper element is positioned for an end portion of the valve plate to contact the bumper element when pivoting toward the closed position; and
wherein the bumper element comprises a metal mesh pad.

\* \* \* \* \*

UNITED STATES PATENT AND TRADEMARK OFFICE
CERTIFICATE OF CORRECTION

PATENT NO. : 9,605,581 B1  
APPLICATION NO. : 15/045565  
DATED : March 28, 2017  
INVENTOR(S) : Robert Leroy Middleton, Jr. et al.

Page 1 of 1

It is certified that error appears in the above-identified patent and that said Letters Patent is hereby corrected as shown below:

On the Title Page

(72) Inventors:
"Robert Leroy Middleton, Jr., Middleville, MI (US); Justin Tyler Middleton, Middleville, MI (US); Robert Leroy Middleton, Sr., Middleville, MI (US)"

Should be:
--Robert Leroy Middleton, Jr., Middleville, MI (US); Justin Tyler Middleton, Middleville, MI (US); Robert Leroy Middleton, Sr., Middleville, MI (US); Bradley Blair Walworth, Jackson, MI (US); Stephen M. Thomas, Laingsburn, MI (US)--

Signed and Sealed this
Twenty-third Day of July, 2019

Andrei Iancu
*Director of the United States Patent and Trademark Office*